United States Patent
Rhee et al.

(10) Patent No.: US 9,680,181 B2
(45) Date of Patent: Jun. 13, 2017

(54) SOLID POLYMER ELECTROLYTE COMPOSITION AND LITHIUM SECONDARY BATTERY INCLUDING THE SAME

(71) Applicant: SOGANG UNIVERSITY RESEARCH FOUNDATION, Seoul (KR)

(72) Inventors: Hee-Woo Rhee, Seoul (KR); Jungmin Lee, Seoul (KR); Eun Bee Kim, Suncheon-si (KR); Kwang Min Kim, Seoul (KR)

(73) Assignee: SOGANG UNIVERSITY RESEARCH FOUNDATION, Seoul (KR)

(*) Notice: Subject to any disclaimer, the term of this patent is extended or adjusted under 35 U.S.C. 154(b) by 408 days.

(21) Appl. No.: 14/249,999

(22) Filed: Apr. 10, 2014

(65) Prior Publication Data
US 2015/0244025 A1 Aug. 27, 2015

(30) Foreign Application Priority Data
Feb. 26, 2014 (KR) .................. 10-2014-0022690

(51) Int. Cl.
| H01M 10/0565 | (2010.01) |
| H01M 10/52 | (2006.01) |
| H01M 10/052 | (2010.01) |
| C08L 83/04 | (2006.01) |
| C08G 77/00 | (2006.01) |

(Continued)

(52) U.S. Cl.
CPC ......... *H01M 10/0565* (2013.01); *C08L 83/04* (2013.01); *H01M 10/052* (2013.01); *C08G 77/00* (2013.01); *C08G 77/045* (2013.01); *C08G 77/14* (2013.01); *H01M 2220/30* (2013.01); *H01M 2300/0082* (2013.01)

(58) Field of Classification Search
None
See application file for complete search history.

(56) References Cited

U.S. PATENT DOCUMENTS

| 6,232,019 | B1 * | 5/2001 | Wunder | H01M 6/181 |
| | | | | 429/300 |
| 2004/0248012 | A1 * | 12/2004 | Pekala | H01M 2/162 |
| | | | | 429/250 |
| 2009/0263725 | A1 * | 10/2009 | Balsara | C08F 297/02 |
| | | | | 429/322 |

FOREIGN PATENT DOCUMENTS

| KR | 10-2003-0019385 | 3/2003 |
| KR | 10-0722834 | 5/2007 |
| KR | 10-1028970 | 4/2011 |

(Continued)

OTHER PUBLICATIONS

Zhang et al., "Blends of POSS-PEO(n=4)8 and High Molecular Weight Poly(ethylene oxide) as Solid Polymer Electrolytes for Lithium Batteries," Jul. 19, 2006, J. Phys. Chem., 111, 3583-3590.*

(Continued)

*Primary Examiner* — Ula C Ruddock
*Assistant Examiner* — Matthew Van Oudenaren
(74) *Attorney, Agent, or Firm* — Greer, Burns & Crain, Ltd.

(57) ABSTRACT

The present disclosure provides a solid polymer electrolyte composition including a polymer matrix, an organic solvent, and an additive agent containing polyhedral silsesquioxane, and also provides a lithium secondary battery including the same.

10 Claims, 3 Drawing Sheets

(51) Int. Cl.
C08G 77/04 (2006.01)
C08G 77/14 (2006.01)

(56) References Cited

FOREIGN PATENT DOCUMENTS

KR  10-2012-0109173       10/2012
KR  10201100027486    *  10/2012

OTHER PUBLICATIONS

Eun-Bee Kim et al., "Nanocomposite Polymer Electrolytes for Highly Improved Conductivity", 2013 Spring Meeting of the Korean Electrochemical Society, Apr. 11, 2013.
Jung-Min Lee, "Preparation and Characterization of Nanocomposite Electrolytes with Organic-Inorganic Hybrid Nanoparticles for Lithium Batteries", Sogang University, May 9, 2013.
Eun-Bee Kim et al., "Nanocomposite Polymer Electrolytes for Highly Improved Ionic Conductivity", Nano Korea 2013 Symposium, Jul. 10, 2013.
Eun-Bee Kim et al., "Hybrid Nanoparticles for Improved Conductivity of Nanocomposite Polymer Electrolytes", The $2^{nd}$ International Conference of Advanced Electromaterials, Nov. 12, 2013.

* cited by examiner

SOLID POLYMER ELECTROLYTE COMPOSITION AND LITHIUM SECONDARY BATTERY INCLUDING THE SAME

CROSS-REFERNCE TO RELATED APPLICATION

This application claims the benefit of Korean Patent Application No. 10-2014-0022690 filed on Feb. 26, 2014, the entire disclosures of which are incorporated herein by reference.

TECHNICAL FIELD

The various embodiments described herein pertain generally to a solid polymer electrolyte composition and a lithium secondary battery including the same.

BACKGROUND

In order to cope with rapidly increasing energy consumption and change it into environment-friendly consumption, many researches have been conducted focusing on alternative energy and an alternative power source, i.e., an electrochemical energy production method. For storage and conversion of electrochemical energy, secondary battery, fuel cells, and capacitors are used. Especially, many researches upon lithium secondary batteries, which are known to have the most outstanding discharge performance, are being conducted.

Along with semiconductors and displays, secondary battery is one of top three core strategic product, which is expected to lead domestic industry of electronic information devices. As for future mobile IT products, such as cellular phones, notebook computers, camcorders, MP3 and PDA, closely related to twenty-first century human life, their performance relies on the secondary battery. Further, the secondary battery is getting more important as a power source of an electric vehicle.

Of the secondary batteries, a lithium polymer battery has been most frequently researched due to its high energy density and discharge voltage. Currently, the lithium polymer is being commercially used for mobile phones and camcorders.

With respect to electrolytes used for the lithium polymer battery, polyethylene oxide) (PEO)-based polymer electrolyte is currently known as one of polymer electrolytes having the highest possibility of commercialization. However, the polymer electrolyte using PEO exhibits relatively high ion conductivity of about $10^{-4}$ S/cm at a high temperature of 60° C. or higher, whereas it exhibits low ion conductivity of about $10^{-8}$ S/cm at a room temperature. This problem is attributed to high crystallinity (x=~80%) of the PEO at the room temperature. Movement of ions within electrolyte is caused by segmentation movement of a polymer, and such movement is restricted in a crystalline area. In this regard, in order to develop polymer electrolyte having high ion conductivity and mechanical strength even at a relatively low temperature and the room temperature by suppressing the crystalline orientation of the polymer electrolyte, many researches are being conducted.

A conventional solid polymer electrolyte for a lithium secondary battery uses various additives for the purpose of controlling the crystallinity of PEO, which is a polymer matrix, in order to secure ion conductivity at a room temperature. For example, Korean Patent No. 10-0722834 describes "Preparing method of polymer electrolyte composite materials and lithium polymer battery using solid polymer electrolyte composite materials prepared by the method." In most cases, however, upon introducing the additives, mechanical properties of the composition may be deteriorated, though crystallinity thereof may be controlled. Furthermore, since the sizes of the additives themselves affect mobility of PEO chains, the additives may cause an increase of a glass transition temperature ($T_g$), which is a highly important factor for ion conductivity at a room temperature and a low temperature. In addition, if the additives are introduced in order to improve strength of the solid polymer electrolyte, the strength of the solid polymer electrolyte may be improved at the expense of elongation. Accordingly, an additive capable of improving both the strength and the elongation of the solid polymer electrolyte needs to be developed.

SUMMARY

In view of the foregoing, example embodiments provide a solid polymer electrolyte composition including a polymer matrix, an organic solvent, and an additive containing polyhedral silsesquioxane, and also provide a lithium secondary battery including the solid polymer electrolyte composition.

However, the problems sought to be solved by the present disclosure are not limited to the above description, and other problems can be clearly understood by those skilled in the art from the following description.

In accordance with a first aspect of the present disclosure, there is provided a solid polymer electrolyte composition containing a polymer matrix, an organic solvent and an additive containing a polyhedral silsesquioxane presented by the following Chemical Formula 1:

[Chemical Formula 1]

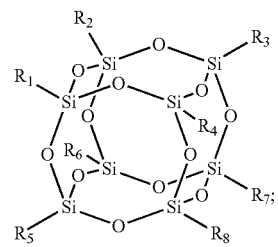

In Chemical Formula 1, each of $R_1$ to $R_8$ independently represents $CH_2CH_2(OCH_2CH_2)_mOCH_3$ and m represents a value of from 4 to 44.

In accordance with a second aspect of the present disclosure, there is provided a lithium secondary battery including a solid polymer electrolyte composition in accordance with the first aspect of the present disclosure, a cathode and an anode.

In accordance with the example embodiments, by introducing a nano-composite additive containing a polyhedral silsesquioxane with a cage structure to a solid polymer electrolyte composition, it may be possible to obtain a solid polymer electrolyte, which has both improved ion conductivity through the control of crystallinity and enhanced strength and elongation through the complement of properties of the electrolyte. Further, it may be possible to provide a solid polymer electrolyte with improved performance, capable of resolve the stability problem of a liquid electrolyte and a gel-type polymer electrolyte that have been used in conventional lithium ion batteries.

Since the polymer electrolyte of the example embodiments has strong mechanical strength, the performance thereof can be maintained even though a thickness thereof is reduced. As a result, thin film formation and low-cost of the lithium secondary battery can be realized.

In addition, since the polymer electrolyte of the example embodiments has both the high ion conductivity and the high strength and elongation, it is expected to contribute to commercialization of high-capacity lithium polymer secondary battery assuring stability in the future.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
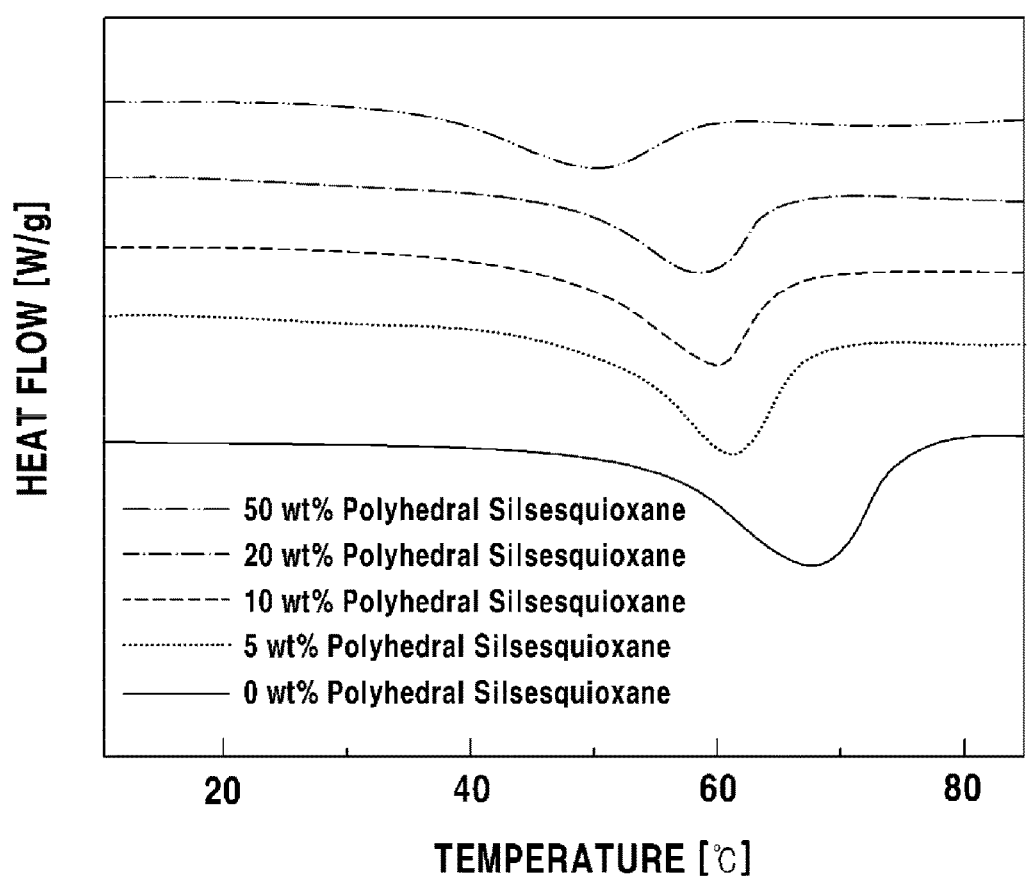
FIG. 1 is a graph showing DSC (Differential Scanning Calorimeter) analysis results of polymer electrolytes in accordance with an example embodiment.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element.

Throughout the whole document, the term "comprises or includes" and/or "comprising or including" used in the document means that one or more other components, steps, operations, and/or the existence or addition of elements are not excluded in addition to the described components, steps, operations and/or elements.

Throughout the whole document, the terms "about or about" or "substantially" are intended to have meanings close to numerical values or ranges specified with an allowable error and intended to prevent accurate or absolute numerical values disclosed for understanding of the present invention from being illegally or unfairly used by any unconscionable third party. Through the whole document, the term "step of" does not mean "step for."

Throughout the whole document, the term "on" that is used to designate a position of one element with respect to another element includes both a case that the one element is adjacent to the another element and a case that any other element exists between these two elements.

Throughout the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, the term "A and/or B" means "A or B" or "A and B."

Hereinafter, example embodiments will be described detail. Here, however, it should be noted that the present disclosure may not be limited to the example embodiments.

In accordance with a first aspect of the present disclosure, there is provided a solid polymer electrolyte composition containing a polymer matrix, an organic solvent and an additive containing a polyhedral silsesquioxane represented by the following Chemical Formula 1:

[Chemical Formula 1]

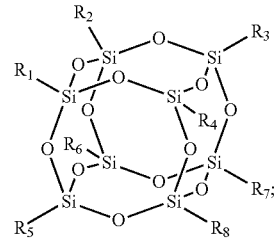

In Chemical Formula 1, each of $R_1$ to $R_8$ independently represents $CH_2CH_2(OCH_2CH_2)_m OCH_3$ and m represents a value of from 4 to 44.

For example, the polyhedral silsesquioxane may include a polyhedral oligomeric silsesquioxane (POSS) having a cage structure, but may not be limited thereto.

Ion conduction of a solid polymer electrolyte may occur in an amorphous region of a polymer included in a polymer matrix. Accordingly, in order to improve the ion conductivity of the solid polymer electrolyte, crystallinity of the crystalline polymer should be reduced by suppressing interaction between chains of the crystalline polymer should be suppressed. To this end, an additive may be introduced. However, in a conventional system of using an additive, although the introduction of the additive enables controlling the crystallinity of the polymer and thus has an effect of improving the ion conductivity, the use of the additive may also result in great deterioration of mechanical properties. If the polyhedral silsesquioxane having a cage structure, which complements the property of the electrolyte through a central silsesquioxane cage structure, is used as an additive to overcome the aforementioned drawback, it may be possible to realize a solid polymer electrolyte having improved ion conductivity through the control of crystallinity and, at the same time, complemented mechanical property. Especially, if the solid polymer electrolyte is prepared by using a solid polymer electrolyte composition including the additive containing the polyhedral silsesquioxane in accordance with the example embodiment, both a strength and an elongation may be concurrently improved, unlike in a case of using an conventional additive.

For example, the polyhedral silsesquioxane may include polyethylene glycol-polyhedral oligomeric silsesquioxane (PEG-POSS) containing polyethylene glycol (PEG) as a functional group, but may not be limited thereto.

As for the polyhedral silsesquioxane represented by the above Chemical Formula 1, functional groups are connected to 8 silicon atoms oriented in 8 different directions based on the central cage structure. Each of the 8 functional groups may include polyethylene glycol commonly used as a plasticizer in an electrolyte system, but may not be limited thereto. The polyethylene glycol may complement insufficient salt dissociation ability of the polymer matrix and may simultaneously serve to control the crystallinity of the solid polymer matrix, but may not be limited thereto. For example, as the amount of the polyhedral silsesquioxane introduced as nano-size additive increases, a glass transition temperature may be decreased, so that molecules may be allowed to move actively. Further, the polyhedral silsesquioxane may also have an effect of, thanks to its stable central cage structure, complementing the mechanical strength, which might be deteriorated due to the control of the crystallinity, but may not be limited thereto.

For example, each length of the 8 functional groups oriented in the 8 different directions in the polyhedral silsesquioxane represented by the above Chemical Formula 1 may be independently adjusted, but may not be limited thereto.

In accordance with an example embodiment, the average number of ethylene oxide (EO) repeating units included in $R_1$ to $R_8$ in Chemical Formula 1 may be in the range of from about 4 to about 44, but may not be limited thereto. For example, the average number of the EO repeating units included in $R_1$ to $R_8$ of Chemical Formula 1 may be about 4 to about 44, about 8 to about 44, about 10 to about 44, about 15 to about 44, about 20 to about 44, about 25 to about 44, about 30 to about 44, about 35 to about 44, about 40 to about 44, about 4 to about 40, about 4 to about 35, about 4 to about 30, about 4 to about 25, about 4 to about 20, about 4 to about 15, about 4 to about 10, or about 4 to about 8, but may not be limited thereto.

By way of example, the solid polymer electrolyte composition of the example embodiment may be used as an electrolyte for a lithium secondary battery or a fuel cell, but not limited thereto.

In case of using the solid polymer electrolyte composition of the example embodiment for a lithium secondary battery, the EO included in the polyethylene glycol forms a complex in the electrolyte through a coordinate bond to lithium salt and enables ion conduction. Accordingly, an increase of the repeating units of the EO implies supplying more ion conductive cites. Further, since the dissociation of the lithium salt increases, it may be possible to move a greater number of lithium free ions. Besides, in the presence of the EO repeating units of polyethylene glycol featuring a low glass transition temperature, a glass transition temperature of the polymer electrolyte may be reduced, thus allowing polymer movement to occur actively. By way of example, the polyethylene glycol may enable an increase of ion conductivity of the polymer electrolyte due to the above-stated effects, but may not be limited thereto.

By way of example, by adjusting the number of the EO repeating units included in $R_1$ to $R_8$ in Chemical Formula 1, it may be possible to regulate performance of the polymer, but may not be limited thereto. If the average number of the EO repeating units included in $R_1$ to $R_8$, is too many, for example, over 44, the polymer matrix and the additive may not be well-mixed, but may not be limited thereto. Accordingly, by adjusting the number of the repeating units of the ethylene oxide included in $R_1$ to $R_8$ of Chemical Formula 1, lengths of side branches of the polyhedral silsesquioxane can be adjusted, whereby performance of the solid polymer electrolyte in accordance with the example embodiment can be adjusted.

In accordance with an example embodiment, a content of the polyhedral silsesquioxane may be in the range of from, but not limited to, about 5 wt % to about 50 wt % with respect to a total weight of the polymer electrolyte. By way of example, with respect to the total weight of the polymer electrolyte, the content of the polyhedral silsesquioxane may be in the range of from, e.g., about 5 wt % to about 50 wt %, about 10 wt % to about 50 wt %, about 20 wt % to about 50 wt %, about 30 wt % to about 50 wt %, about 40 wt % to about 50 wt %, about 5 wt % to about 40 wt %, about 5 wt % to about 30 wt %, about 5 wt % to about 20 wt %, or about 5 wt % to about 10 wt %, but may not be limited thereto.

For example, as the amount of introduction of the polyhedral silsesquioxane as an additive increases, a glass transition temperature, $T_g$ of the polymer included in the polymer matrix may be decreased, as compared to a glass transition temperature $T_g$ of an electrolyte composed of polymer and lithium salt only, but may not be limited thereto. Although additives conventionally introduced into a solid electrolyte system have an effect of controlling crystallinity due to their sizes, such conventional additives deteriorate mobility of polymer chains, resulting in an increase of a glass transition temperature. However, since the polyhedral silsesquioxane of the present example embodiment is an additive having a nano-size, it may reduce the glass transition temperature, thus activating movement of molecules at a low temperature and a room temperature. As a consequence, as compared to the conventionally used electrolyte composed of only the polymer matrix and the lithium salt, the polyhedral silsesquioxane of the present example embodiment may have an effect of improving ion conductivity at a room temperature.

By way of example, the polymer matrix may include a polar atom such as oxygen, nitrogen or sulfur in the polymer, but may not be limited thereto. For example, the polymer matrix may include copolymers of various forms and/or kinds prepared by using grafting, cross-linking or blending based on a polymer matrix containing one selected from the group consisting of poly(ethylene oxide) (PEO), poly(propylene oxide) (PPO), poly(acrylonitrile), (PAN), poly(vinyl chloride) (PVC), poly(vinylidene fluoride) (PVDF), poly(methyl methacrylate)(PMMA), polysiloxane, polyphosphazene, and combinations thereof, but may not be limited thereto.

By way of non-limiting example, the polymer matrix may contain a member selected from the group consisting of, but not limited to, poly(ethylene oxide) (PEO), poly(propylene oxide) (PPO), poly(acrylonitrile), (PAN), poly(vinyl chloride) (PVC), poly(vinylidene fluoride) (PVDF), poly(methyl methacrylate)(PMMA), polysiloxane, polyphosphazene, and their combinations.

In accordance with an example embodiment, the polymer matrix has a molecular weight of about 1,000,000 or more, but not limited thereto. For example, the molecular weight of the polymer matrix may be in the range from, e.g., about 1,000,000 to about 20,000,000, about 1,000,000 to about 15,000,000, about 1,000,000 to about 12,000,000, about 1,000,000 to about 10,000,000, about 1,000,000 to about 8,000,000, about 1,000,000 to about 6,000,000, about 1,000,000 to about 4,000,000, about 1,000,000 to about 2,000,000, about 2,000,000 to about 20,000,000, about 4,000,000 to about 20,000,000, about 6,000,000 to about 20,000,000, about 8,000,000 to about 20,000,000, about 10,000,000 to about 20,000,000, or about 15,000,000 to about 20,000,000, but may not be limited thereto.

In accordance with an example embodiment, the polymer matrix has a molecular weight of about 8,000,000 or more, but may not be limited thereto.

In accordance with an example embodiment, the organic solvent may be selected from the group consisting of carbonates, esters, ethers, ketones, nitriles, and combinations thereof, but may not be limited thereto.

In accordance with an example embodiment, the solid polymer electrolyte composition may further include a lithium salt, but may not be limited thereto.

In accordance with the example embodiment, the lithium salt may include a member selected from the group consisting of lithium hexafluorophosphate (LiPF$_6$), lithium tetrafluoroborate (LiBF$_4$), lithium perchlorate (LiClO$_4$), lithium chloride (LiCl), lithium triflate (LiTf), lithium hexafluoroarsenate (LiAsF$_6$), lithium sulfide (Li$_2$S), lithium sulfate (Li$_2$SO$_4$), lithium phosphate (Li$_3$PO$_4$), lithium citrate (Li$_3$C$_6$H$_5$O$_7$), lithium bis(oxalato)borate (LiBOB), lithium bis(nonafluorosulfonyl)methane, lithium difluoro bisoxalato phosphate (LiF$_4$OP), lithium difluoro(oxalato)borate (LiDFOB), lithium bis(pentafluoroethylsulfonyl)amide (LiBETI), lithium bis(trifluoromethanesulfonyl)imide (LiTFSI), lithium tris(trifluoromethanesulfonyl)methide [LiC(SO$_2$CF$_3$)$_3$], and combinations thereof, but may not be limited thereto.

For example, the polyhedral silsesquioxane as an additive that can be introduced into the solid polymer electrolyte composition containing the polymer matrix and the lithium salt may include polyethylene glycol functional groups positioned in the eight different directions, but may not be limited thereto. When the polyethylene glycol introduced into a gel type polymer electrolyte as a plasticizer along with polyethylene oxide and lithium salt, the solid polymer electrolyte composition exhibits high conductivity of about $1 \times 10^{-3}$ S/cm. Accordingly, when added to the polymer matrix, the polyhedral silsesquioxane may reduce the crystallinity of the polymer matrix and, at the same time, the polyethylene glycol, i.e., the functional groups oriented in the eight different directions may have a capability of dissociating salt on the electrolyte, like the poly(ethylene oxide) (PEO) which is a polymer matrix. Thus, the polyhedral silsesquioxane is capable of complementing an insufficient lithium salt dissociation ability of the polymer matrix. Here, since the increase of degree of salt dissociation implies an increase of the density of lithium free ions dissociated in the electrolyte, the ion conductivity of the solid polymer electrolyte may be improved resultantly.

In accordance with an example embodiment, the polymer matrix may include poly(ethylene oxide) (PEO), but may not be limited thereto.

In accordance with an example embodiment, a molar ratio between the ethylene oxide (EO) included in the solid polymer electrolyte composition and lithium (Li) included in the lithium salt may be in the range of from, e.g., about 4:1 to about 60:1, but may not be limited thereto. By way of example, the molar ratio between the ethylene oxide (EO) and the lithium may be in the range of from, e.g., about 4:1 to about 60:1, about 4:1 to about 50:1, about 4:1 to about 40:1, about 4:1 to about 30:1, about 4:1 to about 24:1, about 4:1 to about 20:1, about 4:1 to about 16:1, about 4:1 to about 12:1, about 4:1 to about 8:1, about 8:1 to about 60:1, about 12:1 to about 60:1, about 16:1 to about 60:1, about 20:1 to about 60:1, about 30:1 to about 60:1, about 40:1 to about 60:1, about 50:1 to about 60:1, or about 10:1 to about 14:1, But may not be limited thereto.

In accordance with an example embodiment, the lithium salt may include a member selected from the group consisting of lithium hexafluorophosphate (LiPF$_6$), lithium tetrafluoroborate (LiBF$_4$), lithium perchlorate (LiClO$_4$), lithium chloride (LiCl), lithium triflate (LiTf), lithium bis(oxalato)borate (LiBOB), lithium bis(nonafluorobutylsulfonyl)methane, lithium difluoro bisoxalato phosphate (LiF$_4$OP), lithium difluoro(oxalate)borate (LiDFOB), Lithium oxalyldifluoroborate (LiODFB), lithium bis(pentafluoroethylsulfonyl)amide (LiBETI), lithium bis(trifluoromethanesulfonyl)imide (LiTFSI), and combinations thereof, but not limited thereto.

In accordance with a second aspect of the present disclosure, there is provided a lithium secondary battery including a solid polymer electrolyte composition in accordance with the first aspect of the present disclosure, a cathode and an anode.

By way of non-limiting example, the lithium secondary battery may include a high-capacity lithium polymer secondary battery having enhanced stability, and the lithium polymer secondary battery may be of a thin film type and of a low price, but may not be limited thereto.

In accordance with an example embodiment, the cathode may include a member selected from the group consisting of LiMn$_2$O$_4$, LiNi$_2$O$_4$, LiTi$_2$O$_4$, LiTiS$_2$, LiCoO$_2$, LiNiO$_2$, LiMnO$_2$, Li$_2$MnO$_3$, LiFePO$_4$, LiFePO$_4$, LiFePO$_4$F, LiMnPO$_4$, LiCoPO$_4$, LiNiPO$_4$, and combinations thereof, but may not be limited thereto.

In accordance with an example embodiment, the anode may include a member selected from the group consisting of graphite, graphene, carbon fired at a low temperature, fired cokes, vanadium oxide, lithium vanadium oxide, lithium germanium oxide, lithium titanate oxide, silicon, silica, lithium silicide, and combinations thereof, but may not be limited thereto. By way of example, the lithium titanate oxide may be, but not limited to, Li$_4$Ti$_5$O$_{12}$. By way of another example, the lithium silicide may be, but not limited to, Li$_{12}$Si$_7$.

Below, examples of the illustrative embodiments will be described. However, the following examples are intended to facilitate understanding of the present disclosure and therefore are not intended to limit its scope.

EXAMPLES

1. Preparation of Polymer Electrolyte Containing Polyhedral Silsesquioxane Added Thereto (Molecular Weight of Poly(Ethylene Oxide): About 1,000,000)

In this example, a solid polymer electrolyte to which polyhedral silsesquioxane (polyethylene glycol-polyhedral silsesquioxane) was added was prepared. The reagents were purchased from Aldrich and Hybrid Plastics Inc. Anhydrous acetonitrile (99.8%, Aldrich) was used as a solvent. Poly(ethylene oxide) (PEO, Aldrich) having a molecular weight of about 1,000,000 was used, and lithium hexafluorophosphate (LiPF$_6$, Aldrich) was used as lithium salt. Further, by using polyhedral silsesquioxane (Hybrid Plastics) as an additive, a thin film type solid polymer electrolyte was prepared.

As an additive, the polyhedral silsesquioxane was added to the PEO, which is a polymer matrix, in amounts of 5 wt %, 10 wt %, 20 wt %, and 50 wt % with respect to a total weight of the composition. Then, to form a PEO-lithium salt complex, lithium salt of $LiPF_6$ was added such that a ratio of EO/Li may be set to be 12/1, and the composition was dissociated in the acetonitrile which is an organic solvent. For the purposes of complete dissociation of the lithium salt, stable formation of the PEO-lithium salt complex, and uniform dispersion of the polyhedral silsesquioxane, the solution was agitated sufficiently (for 24 hours or less) in an oil-bath of about 50° C. by using a magnetic bar, thus obtaining a uniform solution. At this time, ultrasonication was performed intermittently, thus allowing the polyhedral silsesquioxane as an additive to be uniformly dispersed. Then, the uniform solution obtained through this process was put into a Teflon petridish, and an electrolyte film was formed by using solution casting. Thereafter, in order to completely block contact with moisture at a room temperature, the electrolyte film was dried within a glove box filled with high-purity nitrogen for 3 to 4 days, whereby the acetonitrile which is the solvent was sufficiently removed, and a polymer electrolyte containing the polyhedral silsesquioxane added thereto was acquired.

2. Preparation of Polymer Electrolyte Containing Polyhedral Silsesquioxane Added Thereto (Molecular Weight of Poly(Ethylene Oxide): About 8,000,000)

A polymer electrolyte to which polyhedral silsesquioxane was added was prepared through the same method as described above excepting that poly(ethylene oxide) (PEO) having a molecular weight of about 8,000,000 was used and polyhedral silsesquioxane (POSS-PEG(4)) having an average number of four (4) poly(ethylene oxide) residues or polyhedral silsesquioxane (POSS-PEG (13)) having an average number of thirteen (13) poly(ethylene oxide) residues (Hybrid Plastics Inc.) was used. At this time, the POSS-PEG was prepared as follows.

First, monomethyl-PEG and excess allyl bromide were put together and refluxed under the presence of NaOH at a temperature of 50° C. for about 24 hours and, then, was subjected to vacuum filtering. Then, by drying the obtained sample in a vacuum oven at 60° C. for about 24 hours to eliminate the allyl bromide left in the sample, allyl-PEO was prepared. This allyl-PEO preparation process is represented by Reaction Formula 1 as follows:

[Reaction Formula 1]

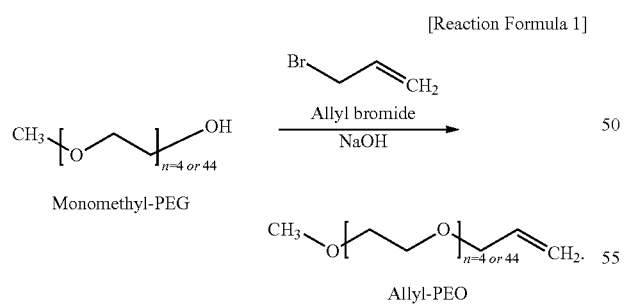

Monomethyl-PEG

Allyl-PEO

Then, octasilane-POSS and excess amount of the allyl-PEO prepared above were put together under a vacuum at a temperature of 60° C. for 24 hours, to thereby eliminate moisture. Then, they were heated at a temperature of 110° C. for 24 hours and, then, they were melted by adding pure $CH_2Cl_2$ under a nitrogen environment. Then, after dropping Karstedt's catalyst in drops, the mixture was allowed to react with each other for 48 hours while the mixture was refluxed at 40° C. Then, the mixture was mixed with activated carbon, and, through vacuum filtering, POSS-PEG was prepared. The residual solvent was evaporated in a depressurized environment. The POSS-PEG preparation process was represented by Reaction Formula 2 as follows:

[Reaction Formula 2]

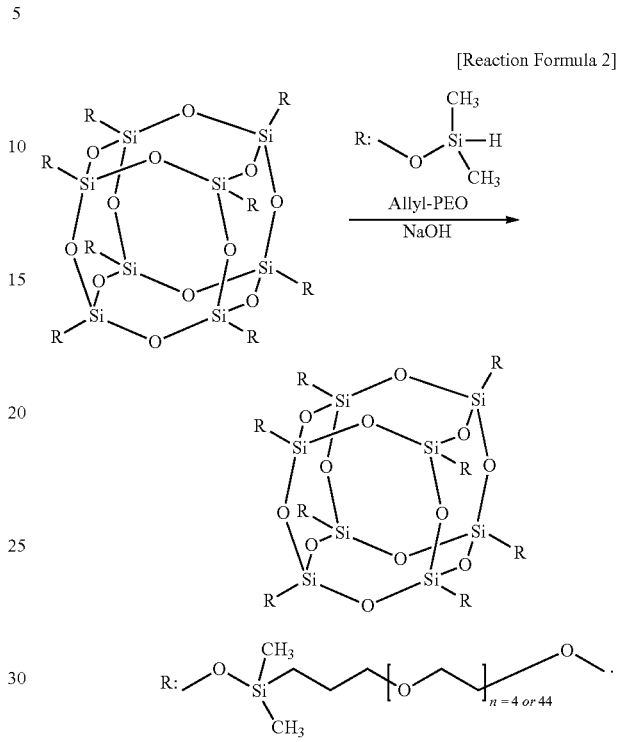

3. Measurement of Glass Transition Temperature and Degree of Crystallinity of Polymer Electrolyte (Molecular Weight of Poly(Ethylene Oxide): About 1,000,000)

In this example, there were measured glass transition temperatures and degrees of crystallinity of solid polymer electrolytes prepared by adding polyhedral silsesquioxane to PEO having a molecular weight of about 1,000,000 and lithium salt ($LiPF_6$) in amounts of 0 wt %, 5 wt %, 10 wt %, 20 wt %, and 50 wt %, respectively, with respect to a total weight of the composition. For comparison, a glass transition temperature and a degree of crystallinity of a solid electrolyte composed of PEO only were also measured. FIG. 1 is a graph showing a result of analyzing these solid polymer electrolytes using differential scanning calorimeters (DSC), and Table 1 provides numeralized results thereof. According to the results shown in FIG. 1 and Table 1, it is found out that as the amount of the polyhedral silsesquioxane introduced as an additive increases, the crystallinity of PEO decreases, resulting in a decrease of a peak area in a melting temperature and a melting range.

TABLE 1

| Content of PEG-Polyhedral Silsesquioxane | Glass Transition Temperature (° C.) | Degree of Crystallinity (%) |
|---|---|---|
| Pure PEO | −51.3 | 83.4 |
| 0 wt % | −31.1 | 54.4 |
| 5 wt % | −35.0 | 41.4 |
| 10 wt % | −34.8 | 39.6 |
| 20 wt % | −39.0 | 35.5 |
| 50 wt % | −46.1 | 19.8 |

4. Measurement of Glass Transition Temperature and Degree of Crystallinity of Polymer Electrolyte (Molecular Weight of Poly(Ethylene Oxide): About 8,000,000)

In the present example, by using PEO having a molecular weight of about 8,000,000 and lithium salt (LiTFSI) ([EO]:[Li]=12:1), there were prepared solid polymer electrolyte to which polyhedral silsesquioxane (POSS-PEG(4)) having an average number of about four(4) PEO residues and polyhedral silsesquioxane (POSS-PEG(13)) having an average number of about thirteen(13) PEO residues were added in amounts of 0 wt %, 10 wt %, and 40 wt % with respect to the total weight of the composition. Then, glass transition temperatures of these solid polymer electrolytes were measured in comparison. The measured glass transition temperatures are specified in Table 2 below.

TABLE 2

| POSS Content | Glass Transition Temperature (° C.) | |
|---|---|---|
| | POSS-PEG(4) | POSS-PEG(13) |
| 0 wt % | −38.9 | −38.9 |
| 10 wt % | −43.7 | −39.8 |
| 40 wt % | −45.6 | −41.9 |

5. Measurement of Variation in Ion Conductivity of Solid Polymer Electrolyte Depending on the Content of Polyhedral Silsesquioxane (Molecular Weight of Poly(Ethylene Oxide): About 1,000,000)

In the present example, ion conductivities of solid polymer electrolytes, which were prepared by adding polyhedral silsesquioxane (POSS-PEG(13)) to PEO having a molecular weight of about 1,000,000 and lithium salt (LiPF$_6$), at a room temperature were measured. Table 3 below shows numerical results of measuring the room-temperature ion conductivities of solid polymer electrolytes prepared by adding the polyhedral silsesquioxane to the PEO and lithium salt (LiPF$_6$) in amounts of 0 wt %, 5 wt %, 10 wt %, 20 wt %, and 50 wt % with respect to the total weight of the composition. The ion conductivities at room-temperature of the solid polymer electrolytes were measured by an AC impedance method using an AC impedance analyzer (Solatron Frequency Response Analyzer 1252A coupled with SI 1287 Electrochemical Interface). For the measurement of the ion conductivities, electrodes made of stainless steel were used, and samples taken in a circular shape having a diameter of 1 cm were inserted between the electrodes within a battery and the ion conductivities thereof were measured in a wide frequency range. Then, after obtaining a bulk resistance of each electrolyte from a measured AC impedance spectrum (Cole-Cole plot), the ion conductivity of each electrolyte was calculated by using the following equations:

$$R=\rho L/A, \rho=RA/L, s=1/\rho.$$

In the above equations, $\rho$, R, A, L and s denote a specific resistance, a measured resistance, a cross sectional area of each sample, a distance between the electrodes and an ion conductivity, respectively.

TABLE 3

| Content of Polyhedral Silsesquioxane | Lithium Salt | Ratio of [EO]/[Li] | Ion Conductivity at Room Temperature (S/cm) |
|---|---|---|---|
| 0 wt % | LiPF$_6$ | 12 | 8.2 × 10$^{-7}$ |
| 5 wt % | LiPF$_6$ | 12 | 8.9 × 10$^{-7}$ |
| 10 wt % | LiPF$_6$ | 12 | 1.1 × 10$^{-6}$ |

TABLE 3-continued

| Content of Polyhedral Silsesquioxane | Lithium Salt | Ratio of [EO]/[Li] | Ion Conductivity at Room Temperature (S/cm) |
|---|---|---|---|
| 20 wt % | LiPF$_6$ | 12 | 2.5 × 10$^{-6}$ |
| 50 wt % | LiPF$_6$ | 12 | 4.0 × 10$^{-6}$ |

According to the above Table 3, an ion conductivity of a solid polymer electrolyte without containing polyhedral silsesquioxane was found to be 8.2×10$^{-7}$. In contrast, ion conductivities of solid polymer electrolytes containing polyhedral silsesquioxane were found to increase with the rise of the content of the introduced polyhedral silsesquioxane. In case of the solid polymer electrolyte to which 50 wt % of polyhedral silsesquioxane was added, its ion conductivity was found to be increased to 4.0×10$^{-6}$ S/cm.

6. Measurement of Variation in Ion Conductivity of Solid Polymer Electrolyte Depending on the Content of Polyhedral Silsesquioxane (Molecular Weight of Poly(Ethylene Oxide): About 8,000,000)

In this example, ion conductivities of solid polymer electrolytes, which were prepared by adding polyhedral silsesquioxane (POSS-PEG(13)) to PEO having a molecular weight of about 8,000,000 and lithium salt (LiPF$_6$, LiTFSI or LiODFB) at a room temperature were measured. Table 4 shows numerical results of measuring the room-temperature ion conductivities of solid polymer electrolytes prepared by adding the polyhedral silsesquioxane to the PEO and lithium salt in amounts of 0 wt %, 5 wt %, 10 wt %, 20 wt % and 50 wt % with respect to the total weight of the composition.

TABLE 4

| Content of POSS | Lithium Salt | Ratio of [EO]/[Li] | Ion Conductivity at Room Temperature (S/cm) |
|---|---|---|---|
| 0 wt % | LiPF$_6$ | 12 | 1.4 × 10$^{-6}$ |
| 5 wt % | LiPF$_6$ | 12 | 2.1 × 10$^{-6}$ |
| 10 wt % | LiPF$_6$ | 12 | 3.0 × 10$^{-6}$ |
| 20 wt % | LiPF$_6$ | 12 | 6.0 × 10$^{-6}$ |
| 50 wt % | LiPF$_6$ | 12 | 2.2 × 10$^{-5}$ |
| 50 wt % | LiTFSI | 12 | 8.5 × 10$^{-5}$ |
| 50 wt % | LiODFB | 10 | 2.7 × 10$^{-5}$ |

As can be seen from the above Table 4, the ion conductivity was found to increase with the rise of the content of the polyhedral silsesquioxane (POSS-PEG). When using other kinds of salts (LiTFSI, LiODFB), high ion conductivities were observed as well.

7. Measurement of Variation in Ion Conductivity of Solid Polymer Electrolyte Depending on the Kind of Lithium Salt (Molecular Weight of Poly(Ethylene Oxide): About 1,000,000)

Figure 2:
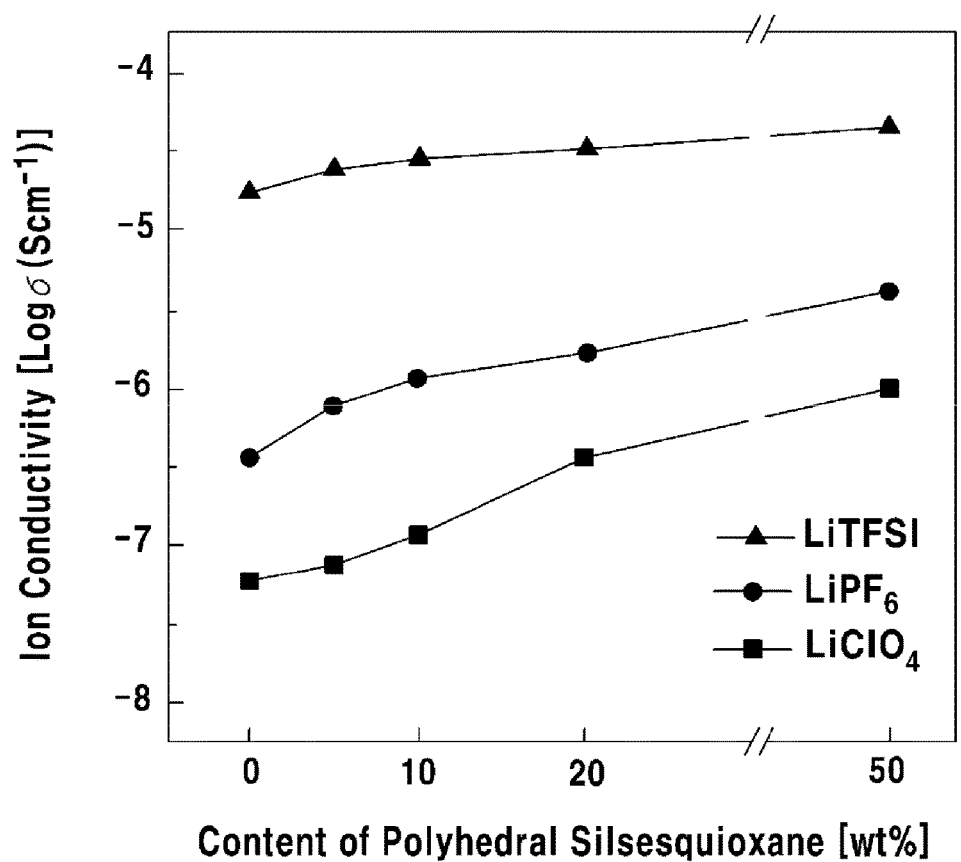
FIG. 2 is a graph showing ion conductivities of polymer electrolytes at a room temperature in accordance with an example embodiment.

In this example, ion conductivities at room-temperature of solid polymer electrolytes containing PEO having a molecular weight of about 1,000,000, polyhedral silsesquioxane and lithium salt (LiTFSI, LiClO$_4$ or LiPF$_6$) were measured. FIG. 2 is a graph showing the ion conductivities at room-temperature of the solid polymer electrolytes containing LiTFSI, LiPF$_6$ or LiClO$_4$. As can be seen from FIG. 2, when using LiTFSI instead of LiPF$_6$, the ion conductivity at room-temperature was found to be 4.3×10$^{-5}$ S/cm at maximum.

8. Measurement of Variation in Ion Conductivity of Solid Polymer Electrolyte Depending on the Kind of Lithium Salt (Molecular Weight of Poly(Ethylene Oxide): About 8,000,000)

Figure 3:
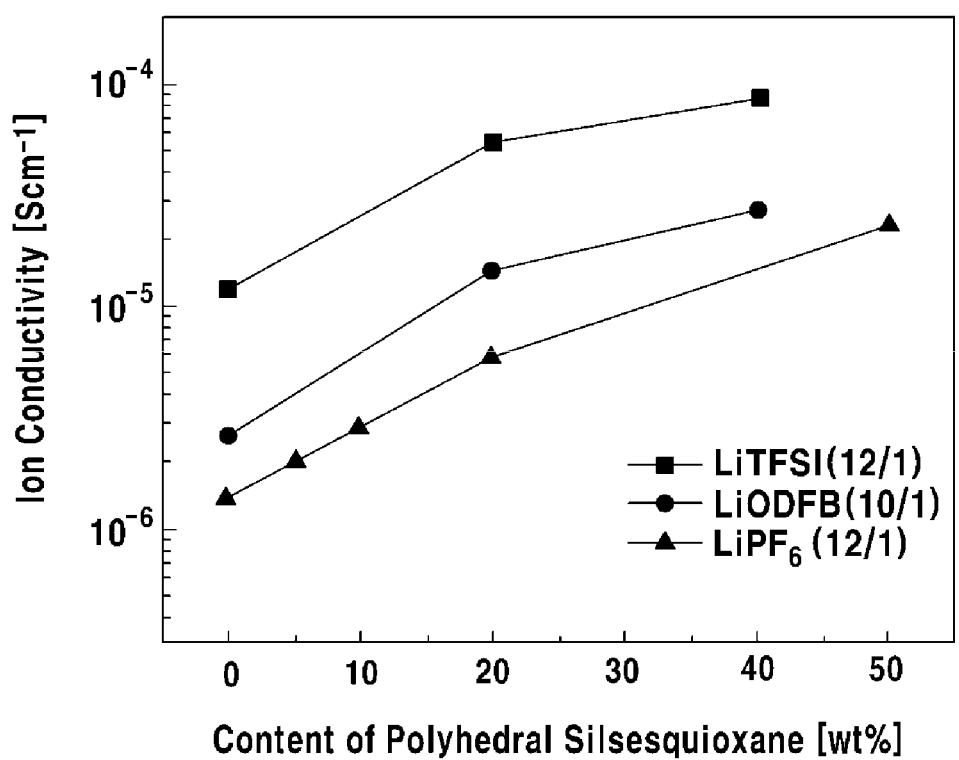
FIG. 3 is a graph showing ion conductivities of polymer electrolytes at a room temperature in accordance with an example embodiment.

In this example, ion conductivities at room-temperature of solid polymer electrolytes containing PEO having a molecular weight of about 8,000,000, POSS-PEG(13) and lithium salt (LiTFSI, LiClO$_4$ or LiPF$_6$) were measured. FIG. 3 is a graph showing the ion conductivities at room temperature of the solid polymer electrolytes containing LiTFSI, LiPF$_6$ or LiClO$_4$. As can be seen from FIG. 3, the ion conductivities of the solid polymer electrolytes containing the different lithium salts were found to increase with the rise of the content (wt %) of the POSS-PEG(13)(POSS).

9. Measurement of Mechanical Strength of Solid Polymer Electrolyte (Molecular Weight of Poly(Ethylene Oxide): About 1,000,000)

In this example, in order to investigate mechanical strengths of solid polymer electrolytes prepared by adding polyhedral silsesquioxane (POSS-PEG(13)) to PEO having a molecular weight of about 1,000,000 and lithium salt (LiPF$_6$) in amounts of 0 wt %, 5 wt %, 10 wt %, 20 wt % and 50 wt % with respect to the total weight of the composition, a tensile test was performed by using a universal testing machine (UTM). For the test, samples were prepared according to the standard of ASTM (American Society for Testing and Materials). By applying force to each of the samples, a tensile strain and a tensile stress were measured by using deformation or rupture generated when the force is applied. A yield stress, which is a critical stress at a yield point where elastic deformation occurs and a yield strain, which is a deformation rate are numeralized and shown in the following Table 5 while classified by the kinds of the solid polymer electrolytes. As can be seen from Table 5, in case of the solid polymer electrolytes to which the polyhedral silsesquioxane was added, due to a physical property compensating effect of their cage structures, their yield stresses were found to be about 1.6 times to about 2.8 times higher than a yield stress of the solid polymer electrolyte without containing the polyhedral silsesquioxane, and, also, their yield strains were also found to be much higher, e.g., about two times to about three times higher than a yield strain of the solid polymer electrolyte without containing the polyhedral silsesquioxane.

TABLE 5

| Content of PEG-Polyhedral Silsesquioxane | Yield Stress (MPa) | Yield Strain (%) |
| --- | --- | --- |
| 0 wt % | 1.5 | 400 |
| 5 wt % | 4.2 | 680 |
| 10 wt % | 4.3 | 1155 |
| 20 wt % | 3.8 | 992 |
| 50 wt % | 2.5 | 145 |

10. Measurement of Mechanical Strength of Solid Polymer Electrolyte (Molecular Weight of Poly(Ethylene Oxide): About 8,000,000)

In this example, mechanical strengths of solid polymer electrolytes prepared by adding polyhedral silsesquioxane (POSS-PEG(13)) to PEO having a molecular weight of about 8,000,000 and lithium salt (LiPF$_6$) in amounts of 0 wt %, 5 wt %, 20 wt % and 50 wt % with respect to the total weight of the composition. Measured yield stresses and yield strains of these solid polymer electrolytes were depicted in Table 6 below.

TABLE 6

| Content of PEG-Polyhedral Silsesquioxane | Yield Stress (MPa) | Yield Strain (%) |
| --- | --- | --- |
| 0 wt % | 4.9 | 192 |
| 5 wt % | 20.2 | 692 |
| 20 wt % | 7.9 | 981 |
| 50 wt % | 6.8 | 543 |

Referring to Table 5 and Table 6, both the yield stress and the yield strain of the solid polymer electrolytes containing the POSS-PEG as an additive were found to be higher than those of the solid polymer electrolytes without containing the POSS-PEG.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

We claim:

1. A solid polymer electrolyte composition, comprising:
a polymer matrix having a molecular weight of about 8,000,000;
a lithium salt;
an organic solvent; and
an additive containing a polyhedral silsesquioxane represented by the following Chemical Formula 1:

[Chemical Formula 1]

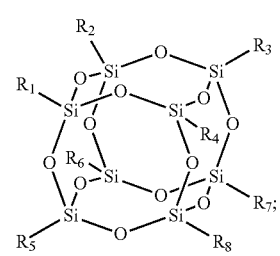

wherein Chemical Formula 1, each of R$_1$ to R$_8$ independently represents CH$_2$CH$_2$(OCH$_2$CH$_2$)$_m$OCH$_3$, and m represents a value of from 4 to 44, and
wherein a molar ratio between the ethylene oxide included in the polymer electrolyte composition and lithium from the lithium salt is 12:1.

2. The solid polymer electrolyte composition of claim 1, wherein the average number of repetiting units of ethylene oxide included in R$_1$ to R$_8$ in Chemical Formula 1 is in the range of from about 4 to about 44.

3. The solid polymer electrolyte composition of claim 1, wherein a content of the polyhedral silsesquioxane is in the range of from about 5 wt % to about 50 wt % with respect to a total weight of the solid polymer electrolyte composition.

4. The solid polymer electrolyte composition of claim 1, wherein the polymer matrix includes a member selected from the group consisting of poly(ethylene oxide), poly(propylene oxide), poly(acrylonitrile), poly(vinyl chloride), poly(vinylidene fluoride), poly(methyl methacrylate), polysiloxane, polyphosphazene, and combinations thereof.

5. The solid polymer electrolyte composition of claim 1, wherein the organic solvent is selected from the group consisting of carbonates, esters, ethers, ketones, nitriles, and combinations thereof.

6. The solid polymer electrolyte composition of claim 1, wherein the lithium salt includes a member selected from the group consisting of lithium hexafluorophosphate, lithium tetrafluoroborate, lithium perchlorate, lithium chloride, lithium triflate, lithium hexafluoroarsenate, lithium sulfide, lithium sulfate, lithium phosphate, lithium citrate, lithium bis(oxalato)borate, lithium bis(nonafluorosulfonyl)methane, lithium difluoro bisoxalato phosphate, lithium difluoro(oxalato)borate, lithium bis(pentafluoroethylsulfonyl)amide, lithium bis(trifluoromethanesulfonyl)imide, lithium tris(trifluoromethanesulfonyl)methide, and combinations thereof.

7. A lithium secondary battery, comprising:
a solid polymer electrolyte composition according to claim 1;
a cathode; and
an anode.

8. The lithium secondary battery of claim 7, wherein the cathode includes a member selected from the group consisting of $LiMn_2O_4$, $LiNi_2O_4$, $LiTi_2O_4$, $LiTiS_2$, $LiCoO_2$, $LiNiO_2$, $LiMnO_2$, $Li_2MnO_3$, $LiFePO_4$, $LiFePO_4LiFePO_4F$, $LiMnPO_4$, $LiCoPO_4$, $LiNiPO_4$, and combinations thereof.

9. The lithium secondary battery of claim 7, wherein the anode includes a member selected from the group consisting of graphite, graphene, carbon fired at a low temperature, fired cokes, vanadium oxide, lithium vanadium oxide, lithium germanium oxide, lithium titanate oxide, silicon, silica, lithium silicide, and combinations thereof.

10. A polymer electrolyte composition, comprising:
a polymer matrix having a molecular weight of about 8,000,000;
a lithium salt;
an organic solvent; and
an additive containing a polyhedral silsesquioxane represented by the following Chemical Formula 1:

[Chemical Formula 1]

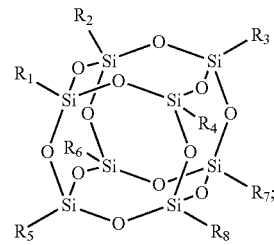

wherein Chemical Formula 1, each of $R_1$ to $R_8$ independently represents $CH_2CH_2(OCH_2CH_2)_mOCH_3$, and m represents a value of 4 or 13; and,
wherein a molar ratio between the ethylene oxide included in the polymer electrolyte composition and lithium from the lithium salt is 12:1.

* * * * *